United States Patent
Brooks et al.

[15] 3,674,828
[45] July 4, 1972

[54] PREPARATION OF LIQUID DIPHENYLMETHANE DIISOCYANATE COMPOSITIONS

[72] Inventors: Martin Frederick Brooks; Vincent Kerrigan, both of Manchester, England

[73] Assignee: Imperial Chemical Industries Limited, London, England

[22] Filed: May 2, 1969

[21] Appl. No.: 821,457

[30] Foreign Application Priority Data

May 14, 1968    Great Britain......................22,884/68

[52] U.S. Cl..............260/453 P, 260/2.5 AT, 260/77.5 AT, 260/453 SP, 260/453 AM, 260/454
[51] Int. Cl......................................................Co7c 119/04
[58] Field of Search.................260/453 P, 453 SP, 453 AM

[56] References Cited

UNITED STATES PATENTS

| | | | |
|---|---|---|---|
| 2,885,421 | 5/1959 | Spiegler | 260/453 |
| 3,367,956 | 2/1968 | Hennig et al | 260/453 |
| 3,394,165 | 7/1968 | McClellan et al | 260/453 |

Primary Examiner—Joseph Rebold
Assistant Examiner—Dolph H. Torrence
Attorney—Cushman, Darby & Cushman

[57] ABSTRACT

A process for the manufacture of a liquid diphenylmethane diisocyanate composition which comprises heating at elevated temperature, a diphenylmethane diisocyanate which is solid or partially solid at 15° C., and a N,N'-disubstituted thiourea or $N^1,N^4$-disubstituted-bis-thiourea in an amount of from 0.25 to 20 percent by weight of the diphenylmethane diisocyanate and distilling out an isothiocyanate from the heated mixture.

6 Claims, No Drawings

PREPARATION OF LIQUID DIPHENYLMETHANE DIISOCYANATE COMPOSITIONS

This invention relates to polyisocyanate compositions in particular liquid storable compositions based on diphenylmethane diisocyanate.

Diphenylmethane diisocyanate often described as methylene bis-(phenyl isocyanate) is one of the isocyanates commonly used in the manufacture of polyurethanes. The diisocyanate is made by phosgenation of the diamine formed by condensation of aniline and formaldehyde and two forms of the isocyanate are normally manufactured. First the crude product made by phosgenation of the total amines obtained by condensation of aniline and formaldehyde in various proportions, which crude product is comprised of the diisocyanate together with higher polyfunctional isocyanates derived from higher polyamines formed in the aniline/formaldehyde condensation. The second form normally manufactured is the pure diisocyanate obtained by distillation of the crude product, an intermediate purification of the diamine, by distillation or some other method, being employed if desired. The pure distilled product comprises mainly diphenylmethane-4,4'-diisocyanate with a few percent of the 2,4'-isomer.

The crude mixtures containing polyisocyanates of higher functionality are normally liquid at room temperature and, therefore, present little difficulty in handling in conventional polyurethane manufacturing machinery.

Pure distilled diphenylmethane diisocyanates and similar diphenylmethane diisocyanates containing small percentages of higher functionality polyisocyanates are solid or at least semi-solid at room temperature, this is disadvantageous in that they have to be melted and kept in the molten state when used in the manufacture of polyurethane in order that they can be transferred by pumping through the pipework etc., of polyurethane machinery and for mixing with the other ingredients of polyurethane forming compositions. Under such conditions i.e. being maintained in the molten state at 50° – 60° C., diphenylmethane diisocyanate tends to undergo some degree of spontaneous polymerization with consequent deposition of solid, this is extremely undesirable. It is, of course, also desirable that diphenylmethane diisocyanates should be capable of incorporation in polyurethane forming compositions at room temperature without heating being required. Diphenylmethane diisocyanates also possess the disadvantage that they deposit sediment on storage.

It has now been found that diphenylmethane diisocyanates which are solid or partially solid at room temperature may be easily and consistently converted into liquid compositions by heating the diphenylmethane diisocyanate with a N,N'-disubstituted thiourea or a $N^1,N^4$-disubstituted-bis-thiourea in an amount of from 0.25 to 25 percent by weight of the diphenylmethane diisocyanate and distilling out an isothiocyanate from the heated mixture.

Thus according to the present invention there is provided a process for the manufacture of a liquid diphenylmethane diisocyanate composition which comprises heating at elevated temperature, a diphenylmethane diisocyanate which is solid or partially solid at 15° C., and a N,N'-disubstituted thiourea or $N^1,N^4$-disubstituted-bis-thiourea in an amount of from 0.25 to 20 percent by weight of the diphenylmethane diisocyanate and distilling out an isothiocyanate from the heated mixture.

Any diphenylmethane diisocyanate which is solid or partially solid at 15° C., can be used in the present process, thus pure 4,4'-diphenylmethane diisocyanate or mixtures of this isomer with any other position isomer may be used. Mixtures comprising the 4,4'-isomer with up to about 10 percent of the 2,4'-isomer have been found particularly suitable. Such mixtures are normally provided by the distillation of the phosgenation product of distilled diaminodiphenylmethane.

Any N,N'-disubstituted thiourea or $N^1,N^4$-disubstituted-bis-thiourea may be used in the present process although it will be readily appreciated by those skilled in the art that the substituents should not be reactive towards the isocyanate group, in other words they should not contain active hydrogen atoms.

Thioureas which may be used include those of the formula R-NHCS-NHR' and bis-thioureas include those of the formula R-NHCS-NH-X-NHCSNHR" (which may be the same or different) in the above formulas represent hydrocarbyl radicals or hydrocarbyl radicals substituted with substituents which are non-isocyanate reactive, for example alkoxy, halogen or nitro substituents, X represents a divalent hydrocarbon radical.

Preferred thioureas and bis-thioureas are those of the formulas given above wherein R and R' are hydrocarbyl radicals and particularly preferred are those thioureas and bis-thioureas wherein one of the radicals R and R' is an aliphatic or cycloaliphatic hydrocarbon group.

Examples of N,N'-disubstituted thioureas which may be used include
  a. N,N'-diphenyl thiourea,
  b. N,N'-di-p-tolyl thiourea,
  c. N phenyl N' n-butyl thiourea,
  d. N phenyl N' cyclohexyl thiourea,
  e. N phenyl N' benzyl thiourea,
  f. N p-tolyl N', n-butyl thiourea,
  g. N p-tolyl N' cyclohexyl thiourea,
  h. N p-tolyl N' benzyl thiourea,
  i. N-n-butyl-N'-p- chlorophenyl thiourea,
  j. N-n-butyl-N'-p-methoxyphenyl thiourea,
  k. N-cyclohexyl-N'-p-nitrophenyl thiourea, Examples of $N^1,N^4$-disubstituted bis-thioureas which may be used include
  l. Hexamethylene-($N^1,N^4$-diphenyl)-bis-thiourea,
  m. Hexamethylene-($N^1,N^4$-di-p-tolyl)-bis-thiourea,
  n. Ethylene-($N^1,N^4$-diphenyl)-bis-thiourea,
  o. Ethylene-($N^1,N^4$-di-p-tolyl)-bis-thiourea Although any amount of the substituted thiourea between 0.25 and 20 percent by weight of the diphenylmethane diisocyanate can be used it is preferred to use between 1.0 and 5.0 percent.

The process may be carried out by heating the isocyanate and thiourea at any desired temperature provided that temperature is such that an isothiocyanate is removed by distillation, it is preferred to distill out the isothiocyanate simultaneously during the whole of the reacting period.

Although the process is normally carried out under reduced pressure in order to facilitate distillation of the isothiocyanate, the process can be carried out under normal atmospheric pressure if the isothiocyanate will distill under such conditions.

Heating at temperatures of 40° to 250° C. is preferred. It is particularly preferred to operate at temperatures of 50° C. to 200° C. under pressure of from 200 mm. to 1 mm Hg.

As with all isocyanate reactions the process is carried out in the absence of moisture and is conveniently carried out under an atmosphere of dry nitrogen.

The process may conveniently be carried out by mixing the isocyanate and thiourea and heating the two together under such conditions that an isothiocyanate is removed by distillation. After completion of reaction and distillation the product is cooled and if any small quantity of insoluble material is present it is removed by filtration.

A solvent of boiling point lower than the diisocyanate can be used if desired, the solvent being removed with the isothiocyanate and assisting in the removal thereof. Suitable solvents include tolylene, xylene, monochlorobenzene and o-dichlorobenzene.

The compositions are mobile liquids at room temperature which show little or no signs of crystallization or deposition of solid for many weeks and are satisfactory isocyanates for incorporation by standard methods with other polyurethane forming materials such as polyethers, polyesters etc. They are useful in the manufacture of polyurethanes which may be in the form of cast products, foams, elastomers, surface coatings or fibers.

The invention is illustrated but not limited by the following examples in which all parts are by weight except where otherwise indicated.

EXAMPLE 1

Diphenylmethane-6,4'-diisocyanate (95 parts) is melted under a nitrogen atmosphere and with stirring N-phenyl N' benzyl thiourea (5 parts) added. The mixture is heated to 120°–130° C. under a reduced pressure of 5 to 15 mm Hg and phenyl isothiocyanate (2.6 parts) is removed by distillation over a period of 2 hours. The clear solution is cooled to room temperature, allowed to stand overnight and the precipitate formed is filtered off leaving a water white mobile liquid of isocyanate value 30.0 percent which shows no sign of crystallization over several weeks. A slight cloudiness may result during subsequent storage.

EXAMPLE 2

The diisocyanate used in Example 1 (96 parts) is melted under a nitrogen atmosphere and with stirring NN' diphenyl thiourea (4 parts) added. The mixture is heated to 120°–130° C. under a reduced pressure of 5 to 15 mm Hg and phenyl isothiocyanate (2.3 parts) is removed over a period of 2 hours by distillation.

The clear solution is cooled to room temperature, allowed to stand overnight and the precipitate formed is filtered off, leaving a water white mobile liquid of isocyanate value 30.5 percent which shows no sign of crystallization over several weeks. A slight cloudiness may result during subsequent storage.

EXAMPLE 3

The diisocyanate used in Example 1, (97 parts) is melted under a nitrogen atmosphere and with stirring NN' di-p-tolyl thiourea (3 parts) added. The mixture is heated to 130°–140° C. under a reduced pressure of 5 to 15 mm Hg and p-tolyl isothiocyanate (1.6 parts) is removed over a period of 3 hours by distillation.

The clear solution is cooled to room temperature, allowed to stand overnight and the precipitate formed is filtered off, leaving a water white mobile liquid of isocyanate value 31 percent which shows no sign of crystallization over several weeks. A slight cloudiness may result during subsequent storage.

EXAMPLE 4

The diisocyanate used in Example 1 (97 parts) is melted under a nitrogen atmosphere and N-phenyl N' cyclohexyl thiourea (3 parts) added with stirring. The mixture is heated to 120°–130° C. under a reduced pressure of 5 to 15 mm Hg and phenyl isothiocyanate (1.5 parts) removed over 2 hours by distillation.

The clear solution is cooled to room temperature, allowed to stand overnight and the precipitate formed is filtered off leaving a water white mobile liquid of isocyanate value 31 percent which shows no signs of crystallization over several weeks. A slight cloudiness may develop during subsequent storage.

EXAMPLE 5

The diisocyanate used in Example 1 (97 parts) is melted under a nitrogen atmosphere and N-phenyl N'n-butyl thiourea (3 parts) added with stirring. The mixture is heated to 120°–130°C under a pressure of 5 to 15mm Hg and phenyl isothicyanate (1.8 parts) removed over 2½ hours by distillation.

The clear solution is cooled to room temperature, allowed to stand overnight and the precipitate formed is filtered off, leaving a water white mobile liquid of isocyanate value 30.8 percent which shows no signs of crystallization over several weeks. A slight cloudiness may develop during subsequent storage.

EXAMPLE 6

The diisocyanate used in Example 1 (98 parts) is melted under a nitrogen atmosphere and hexamethylene $N^1N^4$-diphenyl bis-thiourea (2 parts) added with stirring. The mixture is heated to 120°–130° C. under a reduced pressure of 5 to 15 mm Hg and phenyl isothiocyanate (1.2 parts) removed over 2½ hours by distillation.

The clear solution is cooled to room temperature, allowed to stand overnight and the precipitate formed is filtered off, leaving a water white mobile liquid of isocyanate value 32 percent which shows no signs of crystallization over several weeks. A slight cloudiness may develop during subsequent storage.

The diisocyanate used in all the above six examples contained 1 percent of the $2,4^1$-isomer.

We claim:

1. A process for the manufacture of a liquid diphenylmethane diisocyanate composition which comprises heating at elevated temperature a diphenylmethane -4,4'-diisocyanate containing no more than about 10 percent of the 2,4'isomer and which is solid at 15° C., and a N,N'-disubstituted thiourea of the formula R-NHCS-NHR' or $N^1,N^4$-disubstituted-bis-thiourea of the formula R-NHCSNH-X-NHCSNHR' wherein R and R' represent phenyl radicals optionally substituted with a methyl, chloro, methoxy or nitro substitutent, alkyl radicals with one to four carbon atoms, benzyl or a cyclohexyl radical and X represents a divalent alkyl radical containing two to six carbon atoms, in an amount of from 0.25 to 20 percent by weight of the diphenylmethane -4,4'-diisocyanate and distilling out an isothiocyanate during the heating step.

2. Process as claimed in claim 1 wherein the amount of substituted thiourea is from 1.0 to 5.0 percent of the weight of the diphenylmethane diisocyanate.

3. Process as claimed in claim 1 wherein heating is carried out at a temperature of from 40° C. to 250° C.

4. Process as claimed in claim 6 wherein the temperature is from 50° to 200° C. and heating is carried out under a pressure of from 200 mm to 1 mm Hg.

5. Process for the manufacture of a liquid diphenylmethane composition which comprises heating a diphenylmethane diisocyanate which is solid or partially solid at 15° C., with an N,N'-disubstituted thiourea of the formula R-NHCS-NHR' or an $N^1,N^4$-disubstituted-bis-thiourea of the formula R-NHCSNH-X-NHCSNHR' wherein R and R' represent phenyl radicals optionally substituted with a methyl, chloro, methoxy or nitro substituent, alkyl radicals with one to four carbon atoms, benzyl or a cyclohexyl radical and X represents a divalent alkyl radical containing two to six carbon atoms, in an amount of from 0.25 to 20 percent by weight of the diphenylmethane diisocyanate at a temperature within the range 40° to 250° C. and distilling out an isothiocyanate from the heated mixture.

6. A liquid diphenylmethane diisocyanate composition made by a process comprising heating at elevated temperature, a diphenylmethane -4,4'-disubstituted-bis-thiourea of the formula R-NHCSNH-X-NHCSNHR' wherein R and R' represent phenyl radicals optionally substituted with a methyl, chloro, methoxy or nitro substituent, alkyl radicals with one to four carbon atoms, benzyl or a cyclohexyl radical and X represents a divalent alkyl radical containing two to six carbon atoms, in an amount of from 0.25 to 20 percent by weight of the diphenylmethane diisocyanate and distilling out an isothiocyanate during the heating step.

* * * * *